United States Patent
Zhu et al.

(10) Patent No.: US 11,718,306 B2
(45) Date of Patent: Aug. 8, 2023

(54) METHOD AND APPARATUS FOR ACQUIRING SAMPLE DEVIATION DATA, AND ELECTRONIC DEVICE

(71) Applicant: BEIJING BAIDU NETCOM SCIENCE TECHNOLOGY CO., LTD., Beijing (CN)

(72) Inventors: Houqiang Zhu, Beijing (CN); Pengfei Wei, Beijing (CN); Jia Song, Beijing (CN); Jianxin Jiang, Beijing (CN); Songtao Chang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/339,113

(22) Filed: Jun. 4, 2021

(65) Prior Publication Data
US 2021/0291843 A1 Sep. 23, 2021

(30) Foreign Application Priority Data
Dec. 23, 2020 (CN) .......................... 202011547791.1

(51) Int. Cl.
*B60W 40/09* (2012.01)
*B60W 50/08* (2020.01)

(52) U.S. Cl.
CPC .......... *B60W 40/09* (2013.01); *B60W 50/085* (2013.01); *B60W 2540/10* (2013.01); *B60W 2540/12* (2013.01); *B60W 2540/30* (2013.01)

(58) Field of Classification Search
CPC .. B60W 2520/10; B60W 10/06; B60W 50/14; B60W 10/20; B60W 10/08;
(Continued)

(56) References Cited

U.S. PATENT DOCUMENTS

| 2006/0247838 A1* | 11/2006 | Bauer | .................... B62D 5/008 |
| | | | 701/41 |
| 2009/0228181 A1* | 9/2009 | Luders | ................. B60K 28/165 |
| | | | 701/67 |

(Continued)

FOREIGN PATENT DOCUMENTS

| CN | 111145382 A | 5/2020 |
| DE | 102019202106 A1 | 8/2020 |
| JP | 2017506782 A | 3/2017 |
| JP | 2018024353 A | 2/2018 |
| JP | 2018101400 A | 6/2018 |
| JP | 2019145016 A | 8/2019 |

(Continued)

OTHER PUBLICATIONS

Extended European Search Report of the counterpart EP21176203.4.

(Continued)

*Primary Examiner* — Jelani A Smith
*Assistant Examiner* — Paul A Castro
(74) *Attorney, Agent, or Firm* — J.C. Patents

(57) ABSTRACT

The present application discloses a method and an apparatus for acquiring sample deviation data and an electric device, which relate to the fields of artificial intelligence technology, automatic driving technology, intelligent transportation technology and deep learning technology. The specific implementation solution is: in case of acquiring the sample deviation data, a first driving behavior parameter of a vehicle and a second driving behavior parameter of the vehicle in a simulated automatic driving mode are respectively acquired in the manual driving mode; and it is determined whether there is a deviation between the first driving behavior parameter and the second driving behavior parameter, and if there is a deviation, the vehicle is controlled to acquire the sample deviation data within a preset time period.

8 Claims, 6 Drawing Sheets

(58) Field of Classification Search
CPC ............. B60W 10/04; B60W 2520/14; B60W 2540/12; B60W 10/18; B60W 2540/10; B60W 2540/30; B60W 2556/10; B60W 30/02; B60W 40/09; B60W 10/184; B60W 2710/18; B60W 30/143; B60W 2050/0008; B60W 2520/125; B60W 30/16; B60W 20/00; B60W 2720/10; B60W 30/095; B60W 60/001; B60W 2050/0075; B60W 2050/0088; B60W 2510/20; B60W 2710/20; B60W 2720/14; B60W 40/072; B60W 40/08; B60W 40/114; B60W 50/0097; B60W 2050/0031; B60W 2040/0809; B60W 2040/0818; B60W 2050/0002; B60W 2540/22; B60W 2540/229; B60W 50/08; B60W 60/00; B60W 60/0059; B62D 15/025; B62D 15/029; B62D 5/0481; B62D 15/0285; B62D 1/286; B60T 2270/86; B60T 17/18
See application file for complete search history.

(56) References Cited

U.S. PATENT DOCUMENTS

2019/0176846 A1\* 6/2019 Movert .................. G06N 3/088
2020/0371518 A1 11/2020 Kang
2021/0114593 A1\* 4/2021 Trachte .................. G06N 20/00

FOREIGN PATENT DOCUMENTS

| | | | | |
|---|---|---|---|---|
| JP | 2020101960 A | | 7/2020 | |
| JP | 2021009623 A | \* | 1/2021 | ........... G06T 7/0002 |
| WO | WO2020049685 A1 | | 3/2020 | |

OTHER PUBLICATIONS

First Office Action of the parallel application JP2021-182131.
First Office Action of the parallel application KR10-2021-0074984.
Second Office Action of the parallel application JP2021-182131.

\* cited by examiner

METHOD AND APPARATUS FOR ACQUIRING SAMPLE DEVIATION DATA, AND ELECTRONIC DEVICE

CROSS-REFERENCE TO RELATED APPLICATIONS

This application claims priority to Chinese Patent Application No. 2020115477911, filed on Dec. 23, 2020, which is hereby incorporated by reference in its entirety.

TECHNICAL FIELD

The present application relates to the field of computer technology and, in particular, to a method and an apparatus for acquiring sample deviation data and an electronic device, which can be specifically used in the fields of artificial intelligence technology, automatic driving technology, intelligent transportation technology and deep learning technology.

BACKGROUND

The automatic driving technology is becoming more and more mature and has been applied to automatic driving vehicles. The automatic driving vehicle controls running of vehicles based on an automatic driving model. Although the automatic driving model has been fully tested before it is put into use, due to complexities of real driving environments, in some real driving environments, there may be a deviation between a driving behavior of a vehicle in the automatic driving model and a driving behavior expected by human beings. However, this deviation is not necessarily a fault or an accident, and more likely to be manifested in poor experience or low control efficiency.

SUMMARY

Embodiments of the present application provide a method and an apparatus for acquiring sample deviation data and an electronic device, which improve efficiency of acquiring the sample deviation data in case of acquiring the sample deviation data.

According to a first aspect of the present application, there is provided a method for acquiring sample deviation data which may include:

acquiring, in a manual driving mode, a first driving behavior parameter of a vehicle and a second driving behavior parameter of the vehicle in a simulated automatic driving mode;

determining whether there is a deviation between the first driving behavior parameter and the second driving behavior parameter; and controlling the vehicle to acquire the sample deviation data within a preset time period if there is the deviation; where the sample deviation data includes information of a vehicle body state and information of an environment where the vehicle is located.

According to a second aspect of the present application, there is provided an apparatus for acquiring sample deviation data which may include:

an acquiring unit, configured to acquire, in a manual driving mode, a first driving behavior parameter of a vehicle and a second driving behavior parameter of the vehicle in a simulated automatic driving mode;

a first processing unit, configured to determine whether there is a deviation between the first driving behavior parameter and the second driving behavior parameter; and a control unit, configured to control the vehicle to acquire sample deviation data within a preset time period if there is the deviation; where the sample deviation data includes information of a vehicle body state and information of an environment where the vehicle is located.

According to a third aspect of the present application, there is provided an electronic device which may include:

at least one processor; and a memory communicatively connected with the at least one processor; where the memory stores instructions executable by the at least one processor, and the instructions are executed by the at least one processor to enable the at least one processor to perform the method for acquiring sample deviation data according to the above first aspect.

According to a fourth aspect of the present application, there is provided a non-transitory computer readable storage medium storing computer instructions, where the computer instructions are used for causing a computer to execute the method for acquiring sample deviation data according to the first aspect.

According to a fifth aspect of the present application, there is provided a computer program product, including: a computer program stored in a readable storage medium from which at least one processor of an electronic device can read the computer program, and the at least one processor executes the computer program to cause the electronic device to perform the method for acquiring sample deviation data according to the above first aspect.

It should be understood that what is described in this section is not intended to identify key or important features of the embodiments of the present application, nor is it intended to limit the scope of the present application. Other features of the present application will become apparent from the following description.

BRIEF DESCRIPTION OF THE DRAWINGS

The accompanying drawings are for better understanding of the solution and do not constitute a limitation to the present application, where.

DESCRIPTION OF EMBODIMENTS

Exemplary embodiments of the present application are described below with reference to the accompanying drawings, including various details of the embodiments of the present application for understanding, and should be considered as merely exemplary. Therefore, those of ordinary skilled in the art should realize that various changes and modifications can be made to the embodiments described herein without departing from the scope and spirit of the present application. Likewise, for clarity and conciseness, descriptions of well-known functions and structures are omitted in the following description.

In the embodiments of the present application, "at least one" refers to one or more, and "multiple" refers to two or more. "And/or", which describes the association relationship of related objects, means that there can be three kinds of relationships, for example, A and/or B can mean that A exists alone, A and B exist at the same time, and B exists alone, where A and B can be singular or plural. In the text description of the present application, the character "/" generally indicates that the context objects are of an "or" relationship.

In order to reduce the probability of deviation between a driving behavior of a vehicle under the automatic driving model and a driving behavior expected by human beings, testers need to acquire a large amount of sample deviation data such as external environment information of the vehicle when there is deviation, so as to train the automatic driving model. In the prior art, when acquiring sample deviation data, the common method is: the tester constructs different test environments, and under different test environments, the automatic driving vehicle controls the driving of the vehicle based on the automatic driving model, and the tester records the full amount of running data of the automatic driving vehicle in the whole driving process; afterwards, the running data when the deviation occurs is searched from the recorded total running data and is determined as the sample deviation data, so as to acquire the sample deviation data. However, it will result in low efficiency in acquiring the sample deviation data by using the above manual method to acquire the sample deviation data. Therefore, how to acquire sample deviation data efficiently is an urgent problem to be solved by those skilled in the art.

Figure 1:
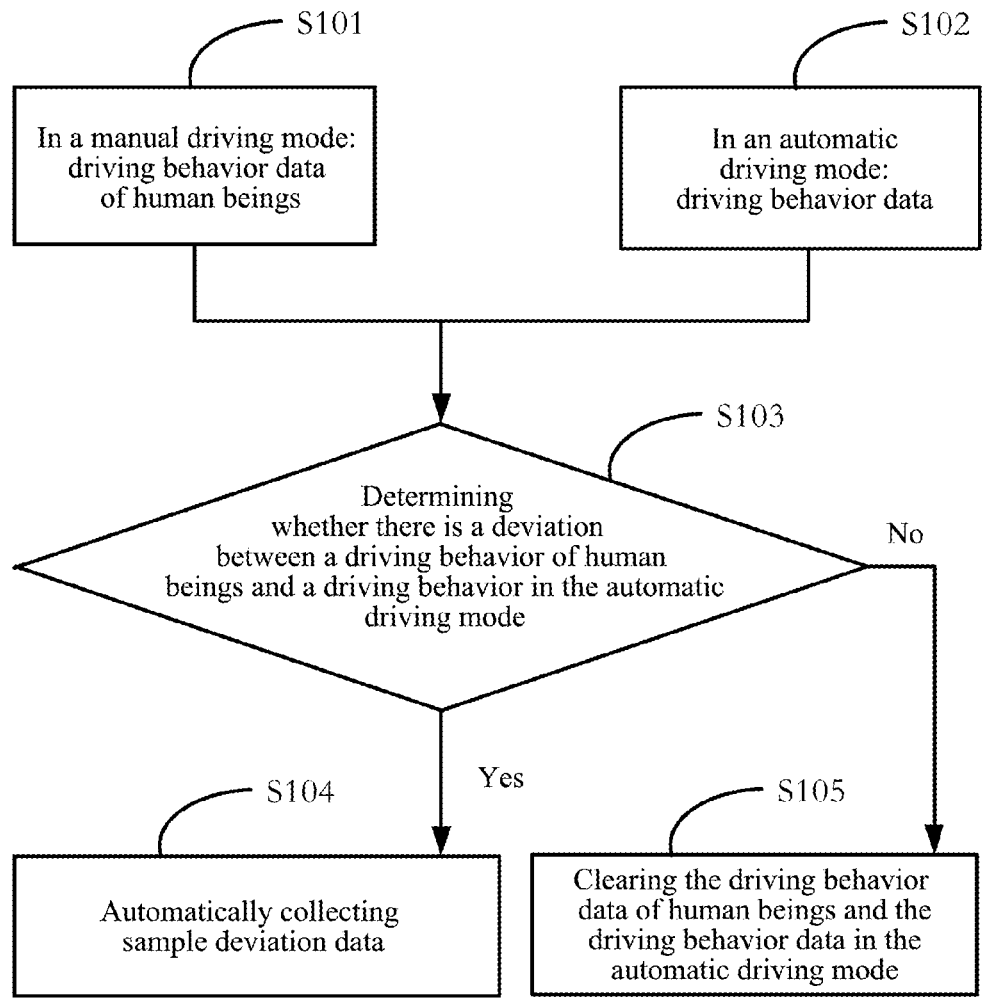
FIG. 1 is a schematic diagram of a framework according to an embodiment of the present application.

In order to improve the efficiency for acquiring sample deviation data, direct acquisition of deviation data when the deviation occurs during the driving process of automatic driving vehicle can be considered, so as to improve the efficiency for acquiring deviation data. However, when acquiring the deviation data during the driving process of an automatic driving vehicle, since the deviation data is the difference between the driving behavior in the automatic driving model and the driving behavior of human beings, it is necessary to respectively acquire the driving behavior in the automatic driving model and the driving behavior of human beings as a reference. However, when an automatic driving vehicle is driving in the automatic driving mode, the driving behavior of human beings cannot be predicted in advance, so it is considered to acquire the deviation data in the manual driving mode. For an example, please refer to FIG. 1, which is a schematic diagram of a framework according to an embodiment of the present application. In case of acquiring the deviation data, the following steps can be executed. S101: in a manual driving mode, acquiring driving behavior data of human beings in a manual driving mode; and S102, while acquiring the driving behavior data of human beings, simulating and outputting the driving behavior data in the current driving environment in the automatic driving mode, and collecting the driving behavior data in the simulated automatic driving mode together. That is, in the process of data collection, the automatic driving vehicle is completely controlled by a driver, and the automatic driving model has nothing to do with control of the vehicle. After respectively acquiring the driving behavior data of human beings and the driving behavior data in the simulated automatic driving mode, the following step is executed. S103: comparing the driving behavior of human beings with the driving behavior of the vehicle in the simulated automatic driving mode. When there is a difference, the following step is executed. S104: collecting sample deviation data automatically, so as to acquire the sample deviation data, which can improve the efficiency for acquiring the sample deviation data. If there is no difference, the following step is executed. S105: clearing the driving behavior data of human beings in the manual driving mode and the driving behavior data in the automatic driving mode.

Based on the above concept, an embodiment of the present application provides a method for acquiring sample deviation data, which can be applied to the fields of artificial intelligence technology, automatic driving technology, intelligent transportation technology and deep learning technology. The specific implementation solution is: acquiring, in the manual driving mode, a first driving behavior parameter of a vehicle and a second driving behavior parameter of the vehicle in a simulated automatic driving mode; determining whether there is a deviation between the first driving behavior parameter and the second driving behavior parameter, and controlling the vehicle to acquire sample deviation data within a preset time period if there is a deviation, where the sample deviation data includes information of a vehicle body state and information of an environment where the vehicle is located.

For example, in case of acquiring the second driving behavior parameter of the vehicle in the simulated automatic driving mode, the second driving behavior parameter of the vehicle in the simulated automatic driving mode can be acquired through the output of the "shadow model", which is used to describe the automatic driving model running together with the driving behavior of human beings in real time. In the automatic driving function links such as perception, environment modeling, route planning and decision-making, the input and configuration of the shadow model are consistent with the official automatic driving model of the vehicle end, so that it forms the same output as that of the official automatic driving model. However, the vehicle is completely controlled by the driver, and the shadow model has nothing to do with the control of the vehicle.

For example, the "shadow model" can be a high way pilot (HWP) shadow model, a traffic jam assistant (TJA) shadow model, or an automatic valet parking (AVP) shadow model, etc., which can be specifically set according to actual needs and is not limited specifically by the embodiments of the present application here. In the manual driving mode, the driving behavior parameters in the automatic driving mode are simulated by the "shadow model", so that the collection of the deviation data in a whole driving scene can be achieved.

In addition, the "shadow model" can be widely applied to mass production vehicles, realizing unlimited time, unlimited region and unlimited number of user vehicle data collection, thereby greatly expanding the boundary of data collection required for research and development, and not only solving the problem that deviation data can only be collected manually in the prior art, but also can cover various scenes of the daily running of the user's vehicle by this form of deviation data collection, which improves the type, range, and feature diversity of the collected deviation data in a certain extent, and provides data source most consisting with the real use scene for the training of the automatic driving model. Therefore, the accuracy of the automatic driving model can be further improved when training the automatic driving model.

It can be understood that in the embodiment of the present application, besides through the output of the "shadow model", the second driving behavior parameter of the vehicle in the simulated autonomous driving mode can also be acquired through the output of other driving models which are similar to the "shadow model", which can be set according to actual needs. The embodiments of the present application is only illustrated by taking the case of acquiring the second driving behavior parameter of the vehicle in the simulated automatic driving mode through the output of the "shadow model" as an example, but it does not mean that the embodiments of the present application are limited thereto.

Figure 2:
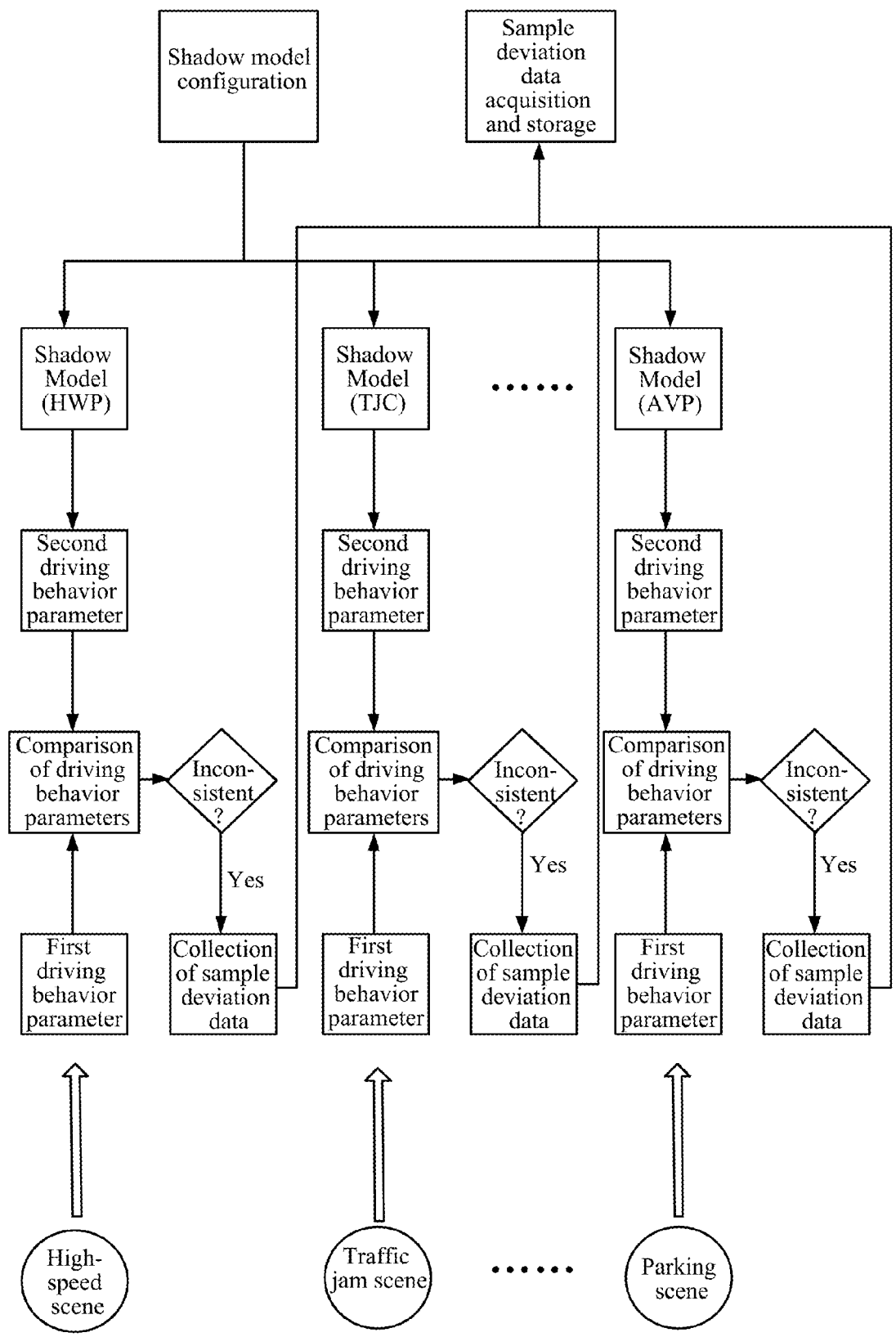
FIG. 2 is a schematic diagram of acquiring sample deviation data according to an embodiment of the present application.

When the second driving behavior parameter of the vehicle in the simulated automatic driving mode is acquired through the output of the "shadow model", please refer to FIG. 2. FIG. 2 is a schematic diagram for acquiring sample deviation data according to an embodiment of the present application. Different "shadow models" are adopted for different driving scenes. In a high-speed scene, the shadow model mainly runs in the HWP mode. And its output second driving behavior parameter is compared with the first driving behavior parameter in the manual driving mode, and the collection of sample deviation data is automatically triggered when the comparison result is inconsistent. In a traffic jam scene, the shadow model mainly runs in the TJC mode. And its output second driving behavior parameter is compared with the first driving behavior parameter in the manual driving mode, and the collection of sample deviation data is automatically triggered when the comparison result is inconsistent. In a parking scene, the shadow model mainly runs in the AVP mode. And its output second driving behavior parameter is compared with the first driving behavior parameter in the manual driving mode, and the collection of sample deviation data is automatically triggered when the comparison result is inconsistent. It can be understood that different "shadow models" will be configured in the vehicle in advance.

It can be seen that, in the embodiment of the present application, in case of acquiring the sample deviation data, a first driving behavior parameter of a vehicle and a second driving behavior parameter of the vehicle in a simulated automatic driving mode are respectively acquired in the manual driving mode; and it is determined whether there is a deviation between the first driving behavior parameter and the second driving behavior parameter, and if there is a deviation, the vehicle is controlled to acquire the sample deviation data within a preset time period. In this way, by establishing a running mechanism of the simulated automatic driving mode, and comparing the driving behavior parameters output in the simulated automatic driving mode with the driving behavior parameters in a real manual driving mode, the vehicle can automatically monitor a driving deviation behavior and can be triggered to automatically collect the sample deviation data when there is the deviation, thereby improving efficiency for acquiring the sample deviation data.

In addition, by adopting the technical solution of the present application, the vehicle can be triggered to automatically collect sample deviation data without manual operation, thereby saving a large of expenses for data collection, cooperation, and screening for the testers. At the same time, the collected sample deviation data is highly targeted, which can ensure that the sample deviation data collected each time is from a scene where there is an deviation between the driving behavior of human beings and the driving behavior of the vehicle in the simulated automatic driving mode, without a large number of invalid data screening operations in a later period, which not only saves labor costs, but also improves the efficiency for acquiring the sample deviation data.

The method for acquiring sample deviation data according to the present application will be described in detail below through specific embodiments. It can be understood that the following specific embodiments can be combined with each other, and the same or similar concepts or processes may not be repeated in some embodiments.

Embodiment I

Figure 3:
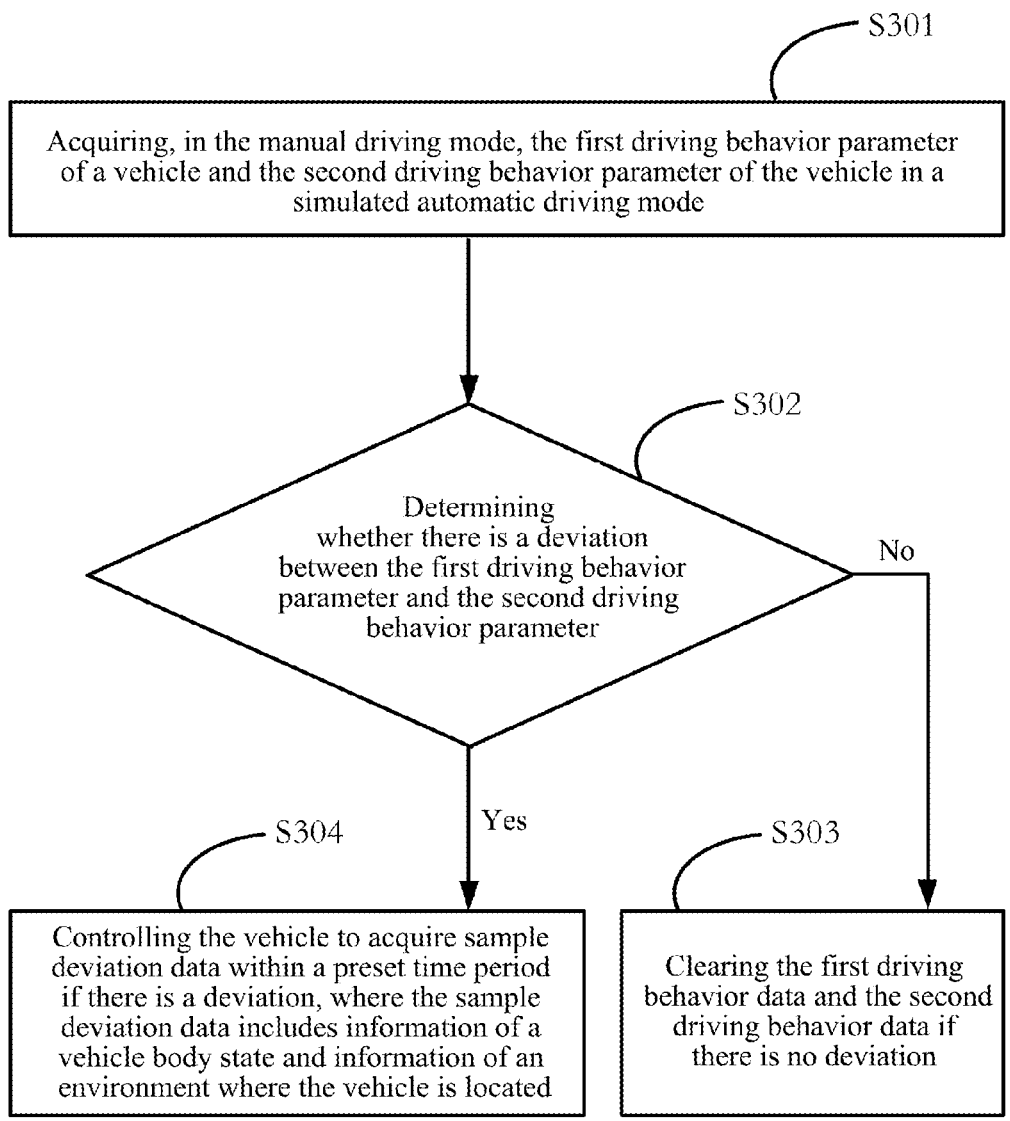
FIG. 3 is a schematic flowchart of a method for acquiring sample deviation data according to Embodiment I of the present application.

FIG. 3 is a schematic flowchart of a method for acquiring sample deviation data according to Embodiment I of the present application. The method for acquiring sample deviation data can be executed by a software and/or hardware apparatus. For example, please refer to FIG. 3, the method for acquiring sample deviation data may include:

S301, acquiring, in the manual driving mode, the first driving behavior parameter of a vehicle and the second driving behavior parameter of the vehicle in a simulated automatic driving mode.

For example, the driving behavior parameters can include position, posture, speed, acceleration, steering wheel angle, gear position, etc., which can be set as required. As for the specific content of the driving behavior parameter, it is not further limited in the embodiment of the present application.

In the embodiment of the present embodiment, the first driving behavior parameter is the driving behavior parameter of the driving behavior of human beings. For example, in case of acquiring the first driving behavior parameter of the vehicle, the driving behavior parameter of the driving behavior of human beings can be acquired from a controller area network (CAN) signal in the manual driving mode, so as to acquire the first driving behavior parameter of the vehicle.

The second driving behavior parameter is the driving behavior parameter of the vehicle in the manual driving mode and the simulated automatic driving mode, that is, the vehicle is completely controlled by the driver, and the automatic driving model has nothing to do with the control the vehicle. For example, in case of acquiring the second driving behavior parameter of the vehicle in the simulated automatic driving mode, the second driving behavior parameter of the vehicle in the simulated automatic driving mode can be acquired through the output of the "shadow model", which is used to describe the automatic driving model running together with the driving behavior of human beings in real time, so as to acquire the second driving behavior parameter of the vehicle. Where the related description of the "shadow model" can be referred to the above description, which will not be repeated in the embodiment of the present application here.

After acquiring, in the manual driving mode, the first driving behavior parameter of the vehicle and the second driving behavior parameter of the vehicle in the simulated automatic driving mode, it can be determined whether there is a deviation between the first driving behavior parameter and the second driving behavior parameter, that is, the following S302 is executed:

S302, determining whether there is a deviation between the first driving behavior parameter and the second driving behavior parameter.

Upon determining whether there is deviation between the first driving behavior parameter and the second driving behavior parameter, if there is no deviation between the first driving behavior parameter and the second driving behavior parameter, the first driving behavior data and the second driving behavior parameter do not need to be stored in the vehicle, and the first driving behavior data and the second driving behavior data can be cleared, that is, the following S303 is executed, so that memory usage caused by storing invalid data can be avoided. Conversely, if there is a deviation between the first driving behavior parameter and the second driving behavior parameter, the vehicle can be controlled to automatically acquire sample deviation data within a preset time period, that is, the following S304 is executed:

S303, clearing the first driving behavior data and the second driving behavior data if there is no deviation; and S304, controlling the vehicle to acquire sample deviation data within a preset time period if there is the deviation, where the sample deviation data includes information of a vehicle body state and information of an environment where the vehicle is located.

For example, the information of the vehicle body state may include, but not limited to, wire control feedback data such as gear position, wheel speed, and an inertial measurement unit (IMU). Environment information may include, but not limited to, sensor data such as front and rear wide angle, surrounding fisheye, and ultrasound. Sample deviation data includes not only the information of the vehicle body state and information of the environment where the vehicle is located, but also data related to the shadow model and basic information of a system. Where the data related to the shadow model includes the output data of the shadow model such as positioning, perception, environment modeling and planning; and the basic information of the system includes system information, version, configuration parameters, etc.

For example, the preset time period may be a time period after the time when it is determined that there is the deviation, or a time period including the first time period and the second time period, which can be specifically set as required.

For example, in the embodiment of the present application, when the vehicle is controlled to acquire sample deviation data within a preset time period, the vehicle can be controlled to collect the sample deviation data in the first time period that takes a time when it is determined that there is the deviation as a starting time, and extract, from collected data, the sample deviation data in the second time period that is before the time when it is determined that there is the deviation, thereby acquiring sample deviation data in a preset time period, where the sample deviation data includes sample deviation data in the first time period and sample deviation data in the second time period.

In the embodiment of the present application, when it is determined that there is a deviation, the reason for acquiring the sample deviation data in the preset time period including both the first time period and the second time period is that: when it is determined that there is the deviation, the deviation behavior thereof has already existed; and if only the deviation data within the first time period taking the time when it is determined that there is the deviation as the starting time is collected, part of the deviation data will not be acquired. Therefore, it is possible to trace back a second time period at the moment when it is determined that there is the deviation, and extract the deviation data in the second time period from the collected data, so as to acquire the sample deviation data corresponding to this deviation behavior, which not only realizes the automatic collection of the sample deviation data, but also improves the integrity of the sample deviation data, so as to meet the requirements of problem diagnosis and automatic driving model training.

It can be seen that in the embodiment of the present application, in case of acquiring the sample deviation data, a first driving behavior parameter of a vehicle and a second driving behavior parameter of the vehicle in a simulated automatic driving mode are respectively acquired in the manual driving mode; and it is determined whether there is a deviation between the first driving behavior parameter and the second driving behavior parameter, and if there is a deviation, the vehicle is controlled to acquire the sample deviation data within a preset time period. In this way, by establishing a running mechanism of the simulated automatic driving mode, and comparing the driving behavior parameters output in the simulated automatic driving mode with the driving behavior parameters in a real manual driving mode, the vehicle can automatically monitor a driving deviation behavior and can be triggered to automatically collect the sample deviation data when there is the deviation, thereby improving efficiency for acquiring the sample deviation data.

Based on the embodiment shown in FIG. 3 above, a detailed description will be given below through Embodiment II shown in FIG. 4 for a better understanding of how to determine whether there is a deviation between the first driving behavior parameter and the second driving behavior parameter in S302 above.

Embodiment II

Figure 4:
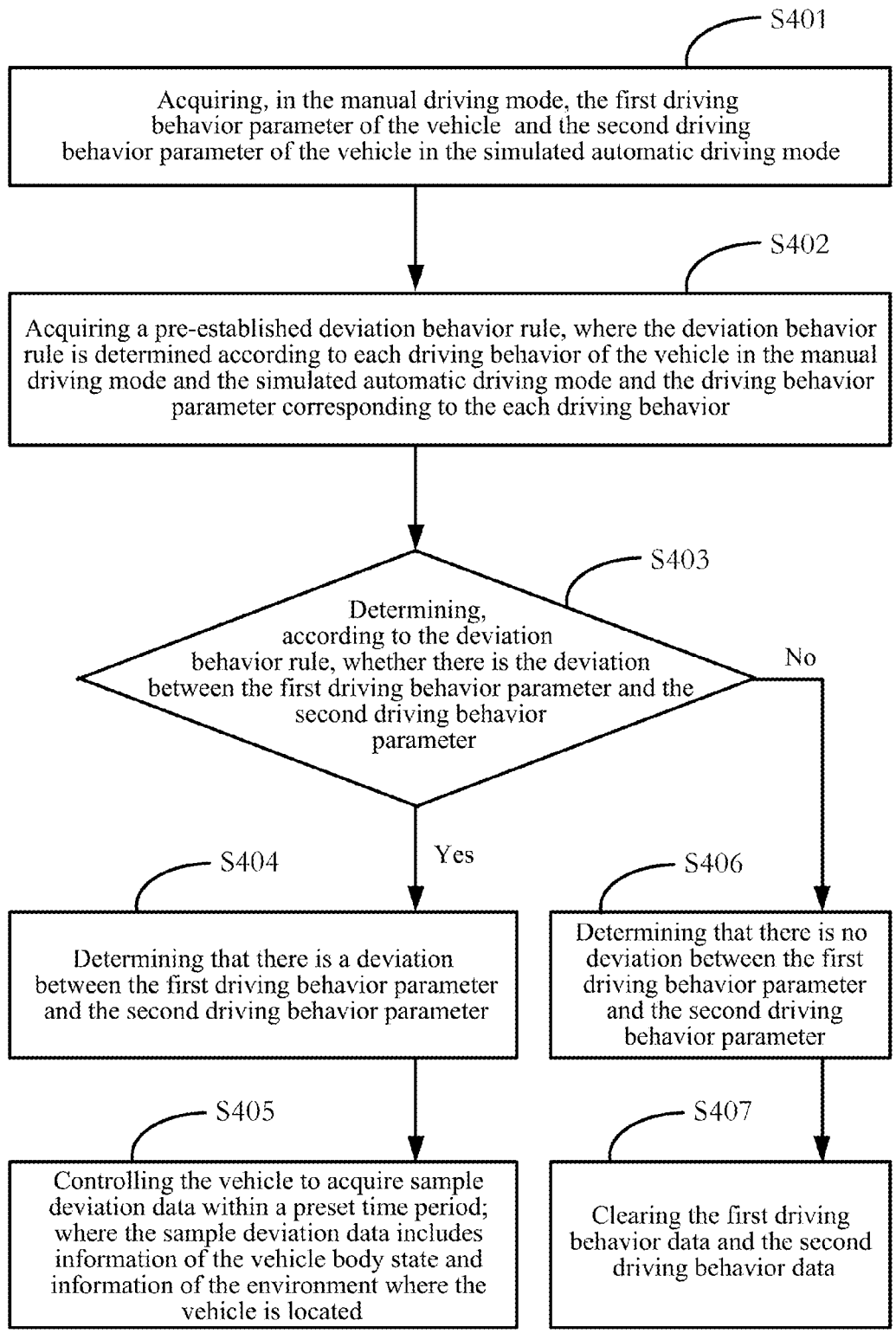
FIG. 4 is a schematic flowchart of a method for acquiring sample deviation data according to Embodiment II of the present application.

FIG. 4 is a schematic flowchart of a method for acquiring sample deviation data according to Embodiment II of the present application. The method for acquiring sample deviation data can also be executed by a software and/or hardware apparatus. For example, please refer to FIG. 4, the method for acquiring sample deviation data may include:

S401, acquiring, in the manual driving mode, the first driving behavior parameter of the vehicle and the second driving behavior parameter of the vehicle in the simulated automatic driving model.

In the embodiment of the present application, the related implementation of S401 is similar to that of S301. For details, please refer to the description of the related implementation of S301 above, which will not be repeated in the embodiment of the present application here.

S402, acquiring a pre-established deviation behavior rule.

Where the deviation behavior rule is determined according to each driving behavior of the vehicle in the manual driving mode and the simulated automatic driving mode and the driving behavior parameter corresponding to the each driving behavior.

It should be noted that in the embodiment of the present application, only before the first determination of whether there is a deviation between the first driving behavior parameter and the second driving behavior parameter, instead of every time the determination is made, it is necessary to acquire the pre-established deviation behavior rule. It can be understood that after it is determined that the deviation behavior rule is updated, and the updated deviation behavior rule can also be acquired again, which can be set specifically according to actual needs.

Generally, in case of acquiring the pre-established deviation behavior rule, the deviation behavior rule pre-established by the cloud server can be received. If the computing power of the processing chip in the vehicle is sufficient to support the proposed deviation behavior rule, the vehicle can also pre-establish the deviation behavior rule, which can be set according to actual needs.

In case of establishing the deviation behavior rule according to each driving behavior and the driving behavior parameter corresponding to the each driving behavior, the driving behaviors can be determined first, and then the deviation behavior rule can be established according to the driving behavior parameter corresponding to the each driving behavior. For example, in the embodiment of the present application, seven basic driving behaviors are involved: parking, following, bypassing, preceding, reversing, accelerating and decelerating. The driving behavior can be one of the seven basic driving behaviors, or a combination of any two or more of the seven basic driving behaviors, driving behaviors such as "braking suddenly in a turning scene", "accelerating in a reversing scene", which can be set according to actual needs. The driving behavior parameters corresponding to various driving behaviors may be different. For example, for the driving behaviors "preceding" and "reversing", they are related to the gear, and the corresponding driving behavior parameters thereof are the gear; and for the driving behaviors of "braking", "following" and "bypassing", they are related to speed, acceleration and steering wheel angle, and the corresponding driving behavior parameters thereof are speed, acceleration and steering wheel angle.

For the driving behaviors, the driving behavior parameters corresponding to the driving behaviors of the vehicle in both the manual driving mode and the simulated automatic driving mode can be determined respectively. Based on the driving behavior parameter corresponding to the each driving behavior, the conditions of deviations in the duration of the driving behaviors in manual driving mode and the simulated automatic driving mode are determined. The combination of the conditions of deviations in the duration of the driving behaviors in manual driving mode and simulated automatic driving mode can constitute a deviation behavior rule, thereby establishing the deviation behavior rule.

For example, in case of determining the conditions of deviations in the duration of the driving behaviors in the manual driving mode and the simulated automatic driving mode, the driving behavior parameters of the driving behaviors in the manual driving mode can be compared with those in the simulated automatic driving mode. If the difference between the driving behavior parameter in the manual driving mode and the driving behavior parameter in the simulated automatic driving mode is less than or equal to a preset value, it is considered that there is no deviation in the duration of the driving behaviors in the manual driving mode and the simulated automatic driving mode. Conversely, if the difference between the driving behavior parameter in the manual driving mode and the driving behavior parameter in the simulated automatic driving mode is larger than the preset value, it is considered that there is a deviation in the duration of the driving behaviors in manual driving mode and the simulated automatic driving mode, so as to determine the conditions of deviations in the duration of the driving behaviors.

For example, in the embodiment of the present application, the conditions of deviations in the duration of the driving behaviors can be abstracted as: the description form of [key data]-[time]-[parameter]-[driving behavior type], and the parameters are related by an and/or relationship. Where the [key data] refers to the driving behavior parameter corresponding to the driving behavior, the [time] refers to the time period for comparison, and the [parameter] refers to the values of driving behavior parameters. Deviation condition serves as the basis for the existence of "deviation" and for triggering the collection of sample deviation data.

For better understanding of the conditions of deviations of the driving behaviors in the manual driving mode and the simulated automatic driving mode, the driving behaviors of parking, following, bypassing, preceding, reversing, accelerating, and decelerating are taken as examples below to describe the conditions of deviations of the driving behaviors in the manual driving mode and simulated the automatic driving mode.

For example, when the driving behavior is "parking", the corresponding driving behavior parameter thereof is speed, and the conditions of the deviation between the driving behavior "parking" in the manual driving mode and the driving behavior "parking" in the simulated automatic driving mode can be:

condition 1: the speed output by the shadow model continues to be zero at time t, while the vehicle speed extracted in the manual driving mode continues to be greater than zero at time t; and condition 2: the speed output by the shadow model continues to be greater than zero at time t, while the vehicle speed extracted in the manual driving mode continues to be zero at time t.

When either condition 1 or condition 2 is met, if the difference between the driving behavior parameter in the manual driving mode and the driving behavior parameter output by the shadow model is greater than a first preset value, it is determined that there is a deviation between the driving behavior "parking" in the manual driving mode and the driving behavior "parking" in the simulated automatic driving mode. Where the first preset value can be set according to actual needs. The embodiment of the present application does not further limit the value of the first preset value here.

In this example, the [key data] are the acceleration in the manual driving mode and the acceleration output by the shadow model; the [time] is the whole time t for comparison; the [parameter] is 0; and the [Driving behavior type] is parking.

For example, when the driving behavior is "following" and the corresponding driving behavior parameter thereof is the steering wheel angle, the conditions of the deviation between the driving behavior "following" in the manual driving mode and the driving behavior "following" in the simulated automatic driving mode can be:

condition 1: the distance from the vehicle ahead output by the shadow model; and the steering wheel angle output by the shadow model keeps increasing at time t, while the steering wheel angle extracted in the manual driving mode continues to be less than a at time t; and condition 2: the distance from the vehicle ahead output by the shadow model; and the steering wheel angle output by the shadow model continues to be less than a at time t, while the steering wheel angle extracted in the manual driving mode keeps increasing at time t.

When either condition 1 or condition 2 is met, if the difference between the driving behavior parameter in the manual driving mode and the driving behavior parameter in the simulated automatic driving mode is greater than a second preset value, it is determined that there is a deviation between driving behavior "following" in the manual driving mode and driving behavior "following" in the simulated automatic driving mode. Where the second preset value can be according to actual needs. The embodiment of the present application does not further limit the value of the second preset value here.

In this example, the [key data] are the steering wheel angle in the manual driving mode and the steering wheel angle output by the shadow model; the [time] is the whole time t for comparison; the [parameter] is a; and the [driving behavior type] is following.

For example, when the driving behavior is "bypassing" and the corresponding driving behavior parameter thereof is the steering wheel angle, the conditions of the deviation between the driving behavior "bypassing" in the manual driving mode and the driving behavior "bypassing" in the simulated automatic driving mode can be:

condition 1: dynamic obstacle information output by the shadow model; and the steering wheel angle output by the shadow model continues to be less than a at time t, while the steering wheel angle extracted in the manual driving mode keeps increasing at time t; and condition 2: the dynamic obstacle information output by the shadow model; the steering wheel angle output by the shadow model keeps increasing at time t, while the steering wheel angle extracted in manual driving mode continues to be less than a at time t.

When either condition 1 or condition 2 is met, if the difference between the driving behavior parameter in the manual driving mode and the driving behavior parameter in the simulated automatic driving mode is greater than a third preset value, it is determined that there is a deviation between the driving behavior "bypassing" in the manual driving mode and the driving behavior "bypassing" in the simulated automatic driving mode. Where the third preset value can be according to actual needs. The embodiment of the present application does not further limit the value of the third preset value here.

In this example, the [key data] are the steering wheel angle in the manual driving mode and the steering wheel angle output by the shadow model; the [time] is the whole time t for comparison; the [parameter] is a; and the [driving behavior type] is bypassing.

For example, when the driving behavior is "preceding/reversing" and its corresponding driving behavior parameter is gear, the conditions of the deviation between the driving behavior "preceding/reversing" in the manual driving mode and the driving behavior "preceding/reversing" in the simulated automatic driving mode can be:

the gear output by the shadow model is inconsistent with the gear extracted in the manual driving mode for more than time t.

In this example, the [key data] are the gear in the manual driving mode and the direction gear output by the shadow model; the [time] is the whole time t for comparison; the [parameter] is the gear parameter value, such as gear P, gear D or gear R; and the [driving behavior type] is preceding/reversing.

For example, when the driving behavior is "decelerating/accelerating" and its corresponding driving behavior parameter is acceleration, the conditions of the deviation between the driving behavior "decelerating/accelerating" in the manual driving mode and the driving behavior "decelerating/accelerating" in the simulated automatic driving mode can be:

condition 1: the acceleration output by the shadow model is greater than 0 within time t, while the acceleration extracted in the manual driving mode is less than $\Delta a$ within time t; and condition 2: the acceleration output by the shadow model is less than $\Delta a$ within time t, while the acceleration extracted in the manual driving mode is greater than 0 within time t.

When either condition 1 or condition 2 is met, it is determined that there is a deviation between the parameter information of the driving behavior of human beings and the parameter information of the driving behavior of the shadow model.

In this example, the [key data] are the vehicle acceleration and acceleration output by the model; the [time] is the whole time t for comparison; the [parameter] are $\Delta a$ and 0; and the [driving behavior type] is deceleration/acceleration.

The above describes in detail the corresponding conditions of the deviations when the driving behaviors are seven basic driving behaviors, namely, parking, following, bypassing, preceding, reversing, accelerating and decelerating. It can be understood that when the driving behavior is a combination of any two or more basic driving behaviors among the seven basic driving behaviors, such as "braking suddenly in a turning scene", "accelerating in a reversing scene", the corresponding conditions of the deviations thereof can be the combination of the corresponding conditions of the deviations of any two or more basic driving behaviors. When the deviation is available to the condition of deviation corresponding to any basic driving behavior, the vehicle will be automatically triggered to collect sample deviation data.

In this way, after acquiring the determined conditions of deviation corresponding to each driving behavior, the combination of the determined conditions of the deviation corresponding to each driving behavior can constitute the deviation behavior rule in the present application, so that when it is determined that there is the deviation according to the deviation behavior rule, the vehicle can be triggered to automatically collect sample deviation data.

After acquiring the pre-established deviation behavior rule, whether there is a deviation between the first driving behavior parameter and the second driving behavior parameter according to the pre-established deviation behavior rule, that is, the following S403 is executed:

S403, determining, according to the pre-established deviation behavior rule, whether there is the deviation between the first driving behavior parameter and the second driving behavior parameter.

The essence of the determining, according to the pre-established deviation behavior rule, whether there is a deviation between the first driving behavior parameter and the second driving behavior parameter, is to determine whether the first driving behavior parameter and the second driving behavior parameter meet the deviation behavior condition; if they meet any condition of the deviation in the deviation behavior rule, the following S404-S405 are executed; conversely, if they do not meet each condition of the deviation in the deviation behavior rule, the following S406-S407 are executed.

S404, determining that there is a deviation between the first driving behavior parameter and the second driving behavior parameter.

If the first driving behavior parameter and the second driving behavior parameter meet any condition of the deviation in the deviation behavior rule, it is determined that there is a deviation between the first driving behavior parameter and the second driving behavior parameter; and when it is determined that there is the deviation, the following S405 is executed:

S405, controlling the vehicle to acquire sample deviation data within a preset time period; where the sample deviation data includes information of the vehicle body state and information of the environment where the vehicle is located.

In the embodiment of the present application, the related implementation of S405 is similar to that of above S304, which can be referred to the description of the related implementation of above S304, and will not be repeated in the embodiment of the present application here.

In case of determining, according to the deviation behavior rule, that there is a deviation between the first driving behavior parameter and the second driving behavior, the vehicle is automatically triggered to collect sample deviation data within a preset time period, so that the vehicle can automatically monitor the driving deviation behavior and can be triggered to automatically collect the sample deviation data when there is the deviation, thereby improving the efficiency of acquiring the sample deviation data.

S406, determining that there is no deviation between the first driving behavior parameter and the second driving behavior parameter.

If the first driving behavior parameter and the second driving behavior parameter do not meet the conditions of each deviation in the deviation behavior rule, it is determined that there is no deviation between the first driving behavior parameter and the second driving behavior parameter; and at this point, the following S407 is executed:

S407, clearing the first driving behavior data and the second driving behavior data.

When it is determined that there is no deviation between the first driving behavior parameter and the second driving behavior parameter, memory occupation caused by storing invalid data can be avoided by clearing the first driving behavior data and the second driving behavior data.

Based on any of the above embodiments, after acquiring the sample deviation data, the sample deviation data can also be sent to the cloud server, so that the cloud server, after receiving the sample deviation data, optimizes the automatic driving model based on the sample deviation data, which can further improve the accuracy of the automatic driving model.

For example, when the obtained sample deviation data is sent to the cloud server, if the network conditions at the time of triggering the collection permit, the collected sample deviation data can be sent to the cloud server in real time during collection of the sample deviation data; conversely, if the network conditions at the time of triggering the collection do not permit, the collected sample deviation data can be cached in the vehicle first, and the sample deviation data cached in the vehicle is sequentially sent, when the network conditions permit, to the cloud server according to the time sequence. For the cloud server, this may automatically trigger collection and uploading of the sample deviation data when there is the deviation between automatic driving behavior and driving behavior of human beings.

In addition, in order to facilitate the cloud server to classify and store the received sample deviation data, the driving behavior of the vehicle can also be determined according to the first driving behavior parameter and/or the second driving behavior parameter, and the driving behavior of the vehicle can be sent to the cloud server as label information of the sample deviation data. In this way, the cloud server can use the driving behavior of the vehicle as the label information of the sample deviation data, which facilitates the classification and storage of the sample deviation data. For example, when the driving behavior of the vehicle is sent to the cloud server as label information of the sample deviation data, the label information can be recorded in a ".json" format file; and the label information can also be recorded in other format files, which can be according to actual needs. The embodiments of the present application are only described by taking the label information being recorded in a ".json" format file as an example, which does not indicate that the embodiments of the present application are limited thereto.

According to the technical solution of the present application, in case of acquiring the sample deviation data, a first driving behavior parameter of a vehicle and a second behavior parameter of the vehicle in a simulated automatic driving mode are respectively acquired in the manual driving mode; and it is determined whether there is a deviation between the first driving behavior parameter and the second driving behavior parameter, and if there is a deviation, the vehicle is controlled to acquire the sample deviation data within a preset time period. In this way, by establishing a running mechanism of the simulated automatic driving mode, and comparing the driving behavior parameters output in the simulated automatic driving mode with the driving behavior parameters in a real manual driving mode, the vehicle can automatically monitor a driving deviation behavior and can be triggered to automatically collect the sample deviation data when there is the deviation, thereby improving efficiency for acquiring the sample deviation data.

Embodiment III

Figure 5:
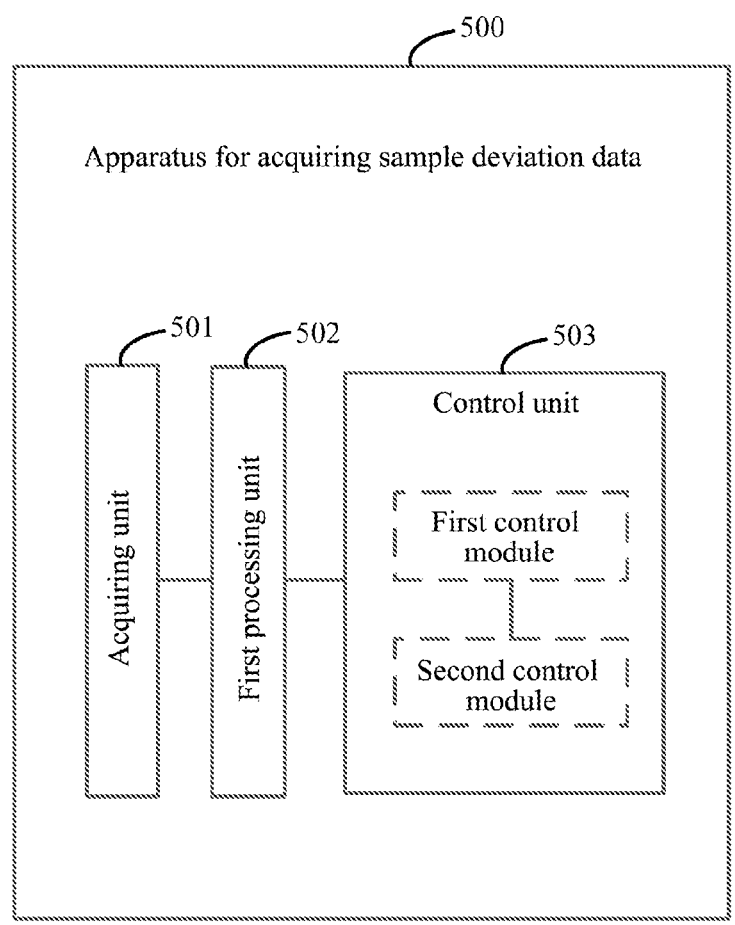
FIG. 5 is a schematic block diagram of an apparatus for acquiring sample deviation data according to Embodiment III of the present application.

FIG. 5 is a schematic block diagram of an apparatus 500 for acquiring sample deviation data according to Embodiment III of the present application. For example, please refer to FIG. 5, the apparatus 500 for acquiring sample deviation data may include:

an acquiring unit 501, configured to acquire, in a manual driving mode, a first driving behavior parameter of a vehicle and a second driving behavior parameter of the vehicle in a simulated automatic driving mode;

a first processing unit 502, configured to determine whether there is a deviation between the first driving behavior parameter and the second driving behavior parameter;

a control unit 503, configured to control the vehicle to acquire sample deviation data within a preset time period if there is the deviation; where the sample deviation data includes information of a vehicle body state and information of an environment where the vehicle is located.

Optionally, the control unit 503 includes a first control module and a second control module.

The first control module is configured to control the vehicle to collect the sample deviation data in a first time period that takes the time when it is determined that there is the deviation as starting time.

The second control module is configured to extract, from the collected data, the sample deviation data in a second time period that is before the time when it is determined that there is the deviation.

Optionally, the first processing unit 502 is specifically configured to determine, if the first driving behavior parameter and the second driving behavior parameter meet the deviation behavior rule, that there is the deviation between the first driving behavior parameter and the second driving behavior parameter; where the deviation behavior rule is determined according to each driving behavior and driving behavior parameter corresponding to each driving behavior of the vehicle in the manual driving mode and the simulated automatic driving mode.

Optionally, the apparatus 500 for acquiring sample deviation data further includes a second processing unit, a third processing unit and a fourth processing unit.

The second processing unit is configured to respectively determine driving behavior parameter corresponding to each driving behavior of the vehicle in the manual driving mode and the simulated automatic driving mode.

The third processing unit is configured to determine, according to the driving behavior parameter corresponding to each driving behavior, the conditions of the deviation of each driving behavior during the continuous time period in the manual driving mode and the simulated automatic driving mode.

The fourth processing unit is configured to establish a deviation behavior rule according to the conditions of deviation of the driving behaviors in the manual driving mode and the simulated automatic driving mode.

Optionally, the third processing unit includes a first processing module and a second processing module.

The first processing module is configured to compare the driving behavior parameters of each driving behavior in the manual driving mode with the driving behavior parameters of each driving behavior in the simulated automatic driving mode.

The second processing module is configured to determine, if a difference between the driving behavior parameters in the manual driving mode and the driving behavior parameters in the simulated automatic driving mode is greater than a preset value, it is determined that there is the deviation within the period of each driving behavior in the manual driving mode and the simulated automatic driving mode.

Optionally, the apparatus 500 for acquiring sample deviation data further includes a first sending unit.

The first sending unit is configured to send the sample deviation data to a cloud server; where the sample deviation data is used for instructing the cloud server to optimize the automatic driving model based on the sample deviation data.

Optionally, the apparatus 500 for acquiring sample deviation data further includes a fifth processing unit and a second sending unit.

The fifth processing unit is configured to determine the driving behavior of the vehicle according to the first driving behavior parameter and/or the second driving behavior parameter.

The second sending unit is configured to send the driving behavior of the vehicle as label information of the sample deviation data to the cloud server.

The apparatus 500 for acquiring sample deviation data according to the embodiment of the present application can implement the technical solution of the method for acquiring the sample deviation data shown in any of the above embodiments, and its implementation principle and beneficial effects are similar to, and thus can be referred to, those of the method for acquiring the sample deviation data and will not be repeated here.

According to an embodiment of the present application, the present application also provides a computer program product, which including: a computer program stored in a readable storage medium, from which at least one processor of an electronic device can read the computer program, and at least one processor executes the computer program to enable the electronic device to execute the solution according to any of the above embodiments. Its implementation principle and beneficial effects are similar to those of the method for acquiring sample deviation data. For details, please refer to the implementation principle and beneficial effects of the method for acquiring sample deviation data, which will not be repeated herein.

According to an embodiment of the present application, the present application also provides an electronic device and a readable storage medium.

Figure 6:
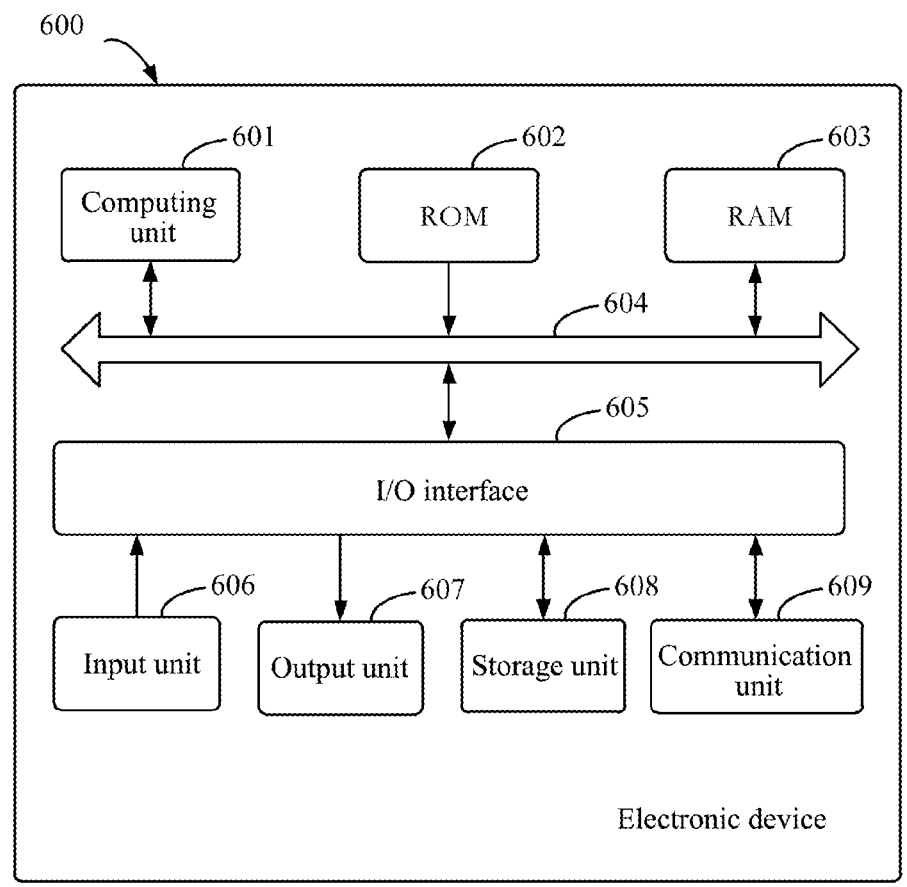
FIG. 6 is a schematic block diagram of an electronic device according to an embodiment of the present application.

FIG. 6 is schematic a block diagram of an electronic device 600 according to an embodiment of the present application. The electronic device refers to present various forms of digital computers, such as laptop computers, desktop computers, workstations, personal digital assistants, servers, blade servers, mainframe computers and other suitable computers. The electronic device may also represent various forms of mobile apparatuses, such as personal digital assistants, cellular phones, smart phones, wearable devices and other similar computing apparatuses. The components shown herein, their connections and relationships, and their functions are merely examples, and are not intended to limit the implementation of the present application described and/or required herein.

As shown in FIG. 6, the electronic device 600 includes a computing unit 601, which can perform various appropriate actions and processing according to a computer program stored in a read only memory (ROM) 602 or a computer program loaded from the storage unit 608 into a random access memory (RAM) 603. In the RAM 603, various programs and data required for the operation of the device 600 can also be stored. The computing unit 601, the ROM 602 and the RAM 603 are connected to each other through a bus 604. An input/output (I/O) interface 605 is also connected to the bus 604.

A plurality of components in the device 600 are connected to the I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the device 600 to exchange information/data with other devices through a computer network such as the Internet and/or various telecommunication networks.

The computing unit 601 may be various general-purpose and/or special-purpose processing components with processing and computing capacities. Some examples of the computing unit 601 include, but are not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 601 performs various methods and processes described above, such as the method for acquiring sample deviation data. For example, in some embodiments, the method for acquiring sample deviation data can be implemented as a computer software program, which is tangibly contained in a machine-readable medium, such as the storage unit 608. In some embodiments, part or entire of the computer program may be loaded and/or installed on the device 600 via the ROM 602 and/or the communication unit 609. When the computer program is loaded into the RAM 603 and executed by the computing unit 601, one or more steps of the method for acquiring sample deviation data described above can be executed. Alternatively, in other embodiments, the computing unit 601 may be configured to execute the method for acquiring sample deviation data in any other suitable manner (for example, by means of firmware).

Various implementations of the systems and technologies described above herein may be implemented in digital electronic circuit systems, integrated circuit systems, field programmable gate arrays (FPGA), application specific integrated circuits (ASIC), application specific standard products (ASSP), a system on chip (SOC), Complex programmable logic devices (CPLD), computer hardware, firmware, software, and/or combinations thereof. These various implementations may include: being implemented in one or more computer programs that can be executed and/or interpreted on a programmable system including at least one programmable processor, which can be a dedicated or general-purpose programmable processor and can receive data and instructions from and transmit data and instructions to a storage system, at least one input apparatus, and at least one output apparatus.

The program codes for implementing the method according to the present application can be written in any combination of one or more programming languages. These program codes may be provided to the processors or controllers of general-purpose computers, special-purpose computers, or other programmable data processing apparatuses, such that the program codes, when executed by the processor or controller, cause the functions/operations specified in the flowcharts and/or block diagrams to be implemented. The program code may be executed entirely on the machine, partially on the machine, and as an independent software package, partially on the machine and partially on the remote machine, or entirely on the remote machine or server.

In the context of the present application, a machine-readable medium may be a tangible medium that may contain or store a program for use by the instruction execution system, the apparatus, or the device or in combination with the instruction execution system, the apparatus, or the device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium may include electrical connections based on one or more wires, portable computer disks, hard disks, a random access memory (RAM), a read-only memory (ROM), a erasable programmable read-only memory (EPROM or a flash memory), optical fiber, a portable compact disk read-only memory (CD-ROM), an optical storage device, a magnetic storage device, or any suitable combination of the above.

In order to provide interaction with the user, the system and technology described here can be implemented on a computer that has: a display apparatus used to display information to users (e.g., a cathode ray tube (CRT) or a liquid crystal display (LCD) monitor); and a keyboard and a pointing apparatus (e.g., a mouse or a trackball), through which the user can provide input to the computer. Other types of apparatuses can also be used to provide interaction with the user; for example, the feedback provided to the user can be any form of sensory feedback (e.g., visual feedback, auditory feedback, or tactile feedback); and any form (including acoustic input, voice input or tactile input) can be used to receive input from the user.

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser, through which the user may interact with the implementations of the system and the technique described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computer system can include clients and servers that are generally far away from each other and usually interact with each other through a communication network. The relationship between the client and the server is generated by computer programs running on corresponding computers and having a client-server relationship with each other. The server can be a cloud server, also known as a cloud computing server or a cloud host, which is a host product in the cloud computing service system, to solve defects of difficult management and weak business scalability in traditional physical host and VPS service ("Virtual Private Server", or VPS for short). The server can also be a server of a distributed system or a server combined with a blockchain.

It should be understood that by using the various forms of procedures shown above, reordering, addition, or deletion of the step can be performed. For example, the steps recorded in the present application can be performed concurrently, sequentially, or in a different order, provided that desirable results of the technical solutions disclosed in the present application could be achieved, which is not limited herein.

The above specific implementations do not constitute a limitation on the protection scope of the present application. Those skilled in the art should understand that various modifications, combinations, sub-combinations, and replacements can be made according to design requirements and other factors. Any modification, equivalent replacement and improvement, etc., made within the spirit and principle of the present application shall be included in the protection scope of the present application.

What is claimed is:

1. A method for acquiring sample deviation data, comprising:
    acquiring, in a manual driving mode, during a continuous time period, a first driving behavior parameter of a vehicle and a second driving behavior parameter of the vehicle in a simulated automatic driving mode;
    comparing, the first driving behavior parameter with the second driving behavior parameter during the continuous time period; wherein the continuous time period refers to a time period for comparison;
    determining whether there is a deviation between the first driving behavior parameter and the second driving behavior parameter during the continuous time period;
    controlling a processor of the vehicle to acquire sample deviation data within a preset time period when there is the deviation; wherein the sample deviation data comprises information of a vehicle body state and information of an environment where the vehicle is located; and
    sending the sample deviation data to a cloud server; wherein the sample deviation data is used for instructing the cloud server to optimize an automatic driving model based on the sample deviation data;
    wherein the controlling a processor of the vehicle to acquire the sample deviation data within a preset time period comprises:

controlling a processor of the vehicle to collect the sample deviation data in a first time period that takes a time when it is determined that there is the deviation as a starting time, and extracting, from collected data, the sample deviation data in a second time period that is before the time when it is determined that there is the deviation;

wherein the first time period and the second time period are two adjacent time periods, and there exists the deviation within both the first time period and the second time period;

wherein the determining whether there is a deviation between the first driving behavior parameter and the second driving behavior parameter during the continuous time period comprises:

determining, when the first driving behavior parameter and the second driving behavior parameter meet a deviation behavior rule, that there is the deviation between the first driving behavior parameter and the second driving behavior parameter; wherein the deviation behavior rule is determined according to a driving behavior and the driving behavior parameter corresponding to the driving behavior of the vehicle in both the manual driving mode and the simulated automatic driving mode;

wherein the method further comprises:

determining, the driving behavior parameter corresponding to the driving behavior of the vehicle in the manual driving mode and the simulated automatic driving mode, respectively;

determining, according to the driving behavior parameter corresponding to the driving behavior, a condition under which the driving behavior have a deviation during the continuous time period in the manual driving mode and the simulated automatic driving mode; and establishing, according to the condition under which the driving behavior has a deviation in the manual driving mode and the simulated automatic driving mode, the deviation behavior rule.

2. The method according to claim 1, wherein the determining, according to the driving behavior parameter corresponding to the driving behavior, conditions under which driving behaviors has deviations during a continuous time period in the manual driving mode and the simulated automatic driving mode comprises:

comparing, the driving behavior parameter of the driving behavior in the manual driving mode with the driving behavior parameter of the driving behavior in the simulated automatic driving mode; and determining, when a difference between the driving behavior parameter in the manual driving mode and the driving behavior parameter in the simulated automatic driving mode is greater than a preset value, that the driving behavior has the deviation during the continuous time period in the manual driving mode and the simulated automatic driving mode.

3. The method according to claim 1, wherein the method further comprises:

determining the driving behavior of the vehicle according to the first driving behavior parameter and the second driving behavior parameter; and taking the driving behavior of the vehicle as label information of the sample deviation data and sending it to the cloud server.

4. An apparatus for acquiring sample deviation data, comprising:

at least one processor; and a memory communicatively connected with the at least one processor; wherein, the memory stores instructions executable by the at least one processor, and the instructions are executed by the at least one processor to enable the at least one processor to:

acquire, in a manual driving mode, during a continuous time period, a first driving behavior parameter of a vehicle and a second driving behavior parameter of the vehicle in a simulated automatic driving mode;

compare, the first driving behavior parameter with the second driving behavior parameter during the continuous time period; wherein the continuous time period refers to a time period for comparison;

determine, whether there is a deviation between the first driving behavior parameter and the second driving behavior parameter during the continuous time period;

control a processor of the vehicle to acquire sample deviation data within a preset time period when there is the deviation; wherein the sample deviation data comprises information of a vehicle body state and information of an environment where the vehicle is located; and send the sample deviation data to a cloud server; wherein the sample deviation data is used for instructing the cloud server to optimize an automatic driving model based on the sample deviation data;

wherein the instructions further enable the at least one processor to:

control a processor of the vehicle to collect the sample deviation data in a first period that takes a time when it is determined that there is the deviation as starting time; and extract, from collected data, the sample deviation data in a second time period that is before the time when it is determined that there is the deviation;

wherein the first time period and the second time period are two adjacent time periods, and there exists the deviation within both the first time period and the second time period;

wherein the instructions further enable the at least one processor to:

determine, when the first driving behavior parameter and the second driving behavior parameter meet a deviation behavior rule, that there is the deviation between the first driving behavior parameter and the second driving behavior parameter; wherein the deviation behavior rule is determined according to a driving behavior and the driving behavior parameter corresponding to the driving behavior of the vehicle in both the manual driving mode and the simulated automatic driving mode;

wherein the instructions further enable the at least one processor to:

determine, the driving behavior parameter corresponding to the driving behavior of the vehicle in the manual driving mode and the simulated automatic driving mode, respectively;

determine, according to the driving behavior parameter corresponding to the driving behavior, a condition under which the driving behavior have a deviation during the continuous time period in the manual driving mode and the simulated automatic driving mode; and establish, according to the condition under which the driving behavior has a deviation in the manual driving mode and the simulated automatic driving mode, the deviation behavior rule.

5. The apparatus according to claim 4, wherein the instructions further enable the at least one processor to:
compare the driving behavior parameter of the driving behavior in the manual driving mode with the driving behavior parameter of the driving behavior in the simulated automatic driving mode; and
determine, when a difference between the driving behavior parameter in the manual driving mode and the driving behavior parameter in the simulated automatic driving mode is greater than a preset value, that the driving behavior has the deviation during the continuous time period in the manual driving mode and the simulated automatic driving mode.

6. The apparatus according to claim 4, wherein the instructions further enable the at least one processor to:
determine, the driving behavior of the vehicle according to at least one of the following parameters: the first driving behavior parameter and the second driving behavior parameter; and
take the driving behavior of the vehicle as label information of the sample deviation data and send it to the cloud server.

7. A non-transitory computer-readable storage medium storing computer instructions, wherein the computer instructions are used for causing a computer to:
acquire, in a manual driving mode, during a continuous time period, a first driving behavior parameter of a vehicle and a second driving behavior parameter of the vehicle in a simulated automatic driving mode;
compare, the first driving behavior parameter with the second driving behavior parameter during the continuous time period; wherein the continuous time period refers to a time period for comparison;
determine whether there is a deviation between the first driving behavior parameter and the second driving behavior parameter during the continuous time period;
control a processor of the vehicle to acquire sample deviation data within a preset time period when there is the deviation; wherein the sample deviation data comprises information of a vehicle body state and information of an environment where the vehicle is located; and
send the sample deviation data to a cloud server; wherein the sample deviation data is used for instructing the cloud server to optimize an automatic driving model based on the sample deviation data;
wherein the computer instructions are used for further causing the computer to:
control a processor of the vehicle to collect the sample deviation data in a first period that takes a time when it is determined that there is the deviation as starting time; and
extract, from collected data, the sample deviation data in a second time period that is before the time when it is determined that there is the deviation;
wherein the first time period and the second time period are two adjacent time periods, and there exists the deviation within both the first time period and the second time period;
wherein the computer instructions are used for further causing the computer to:
determine, when the first driving behavior parameter and the second driving behavior parameter meet a deviation behavior rule, that there is the deviation between the first driving behavior parameter and the second driving behavior parameter; wherein the deviation behavior rule is determined according to a driving behavior and the driving behavior parameter corresponding to the driving behavior of the vehicle in both the manual driving mode and the simulated automatic driving mode;
wherein the computer instructions are used for further causing the computer to:
determine, the driving behavior parameter corresponding to the driving behavior of the vehicle in the manual driving mode and the simulated automatic driving mode, respectively;
determine, according to the driving behavior parameter corresponding to the driving behavior, a condition under which the driving behavior have a deviation during the continuous time period in the manual driving mode and the simulated automatic driving mode; and
establish, according to the condition under which the driving behavior has a deviation in the manual driving mode and the simulated automatic driving mode, the deviation behavior rule.

8. The non-transitory computer-readable storage medium according to claim 7, wherein the computer instructions are used for further causing the computer to:
compare the driving behavior parameter of the driving behavior in the manual driving mode with the driving behavior parameter of the driving behavior in the simulated automatic driving mode; and
determine, when a difference between the driving behavior parameter in the manual driving mode and the driving behavior parameter in the simulated automatic driving mode is greater than a preset value, that the driving behavior has the deviation during the continuous time period in the manual driving mode and the simulated automatic driving mode.

* * * * *